United States Patent
Hui et al.

(10) Patent No.: US 10,540,624 B2
(45) Date of Patent: Jan. 21, 2020

(54) SYSTEM AND METHOD TO AUTOMATE PROVENANCE-AWARE APPLICATION EXECUTION

(71) Applicant: INTERNATIONAL BUSINESS MACHINES CORPORATION, Armonk, NY (US)

(72) Inventors: Joshua W. Hui, San Jose, CA (US); Eser Kandogan, San Jose, CA (US); Harsha V. Krishnareddy, San Jose, CA (US); Mary A. Roth, San Jose, CA (US); Peter M. Schwarz, San Jose, CA (US); Ignacio G. Terrizzano, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 670 days.

(21) Appl. No.: 15/215,469

(22) Filed: Jul. 20, 2016

(65) Prior Publication Data
US 2018/0025307 A1    Jan. 25, 2018

(51) Int. Cl.
*G06F 9/44* (2018.01)
*G06Q 10/06* (2012.01)
*G06F 8/30* (2018.01)

(52) U.S. Cl.
CPC ......... *G06Q 10/06316* (2013.01); *G06F 8/30* (2013.01)

(58) Field of Classification Search
CPC ............................................. G06Q 10/063–067
See application file for complete search history.

(56) References Cited

U.S. PATENT DOCUMENTS

| | | |
|---|---|---|
| 9,053,437 B2 | 6/2015 | Adler |
| 9,286,146 B2 * | 3/2016 | Buth .................. G06F 9/546 |
| 2010/0114627 A1 * | 5/2010 | Adler ................. G06Q 10/06 |
| | | 705/7.11 |
| 2010/0114628 A1 * | 5/2010 | Adler ................. G06Q 10/063 |
| | | 705/7.11 |

(Continued)

OTHER PUBLICATIONS

IBM, Method and System for Automating Workflow Participation, ip.com No. 000184058, Jun. 9, 2009.

(Continued)

*Primary Examiner* — Adam Lee
(74) *Attorney, Agent, or Firm* — Cantor Colburn LLP; Daniel Johnson

(57) ABSTRACT

A method to support ad hoc collaboration and generation of workflows for a team of users may comprise providing data from a provenance graph to launched applications, selectively using the provided data from the provenance graph and additional input to create derived data and derived outputs, and routing the derived data and the derived outputs to the provenance graph; recording, in the provenance graph, subsequences of the launched applications; recommending one of the recorded subsequences, based on the history of execution of the recorded subsequences of the launched applications; creating a new application with the recommended subsequences of the launched applications; launching the newly created application, and storing the newly created application in a catalog of applications for use by the user.

18 Claims, 18 Drawing Sheets

(56) References Cited

U.S. PATENT DOCUMENTS

| | | | | |
|---|---|---|---|---|
| 2010/0114629 A1* | 5/2010 | Adler | ............ | G06Q 10/00 |
| | | | | 705/7.36 |
| 2010/0114630 A1* | 5/2010 | Adler | ............ | G06Q 10/06 |
| | | | | 705/7.36 |
| 2011/0295854 A1* | 12/2011 | Chiticariu | ......... | G06F 16/313 |
| | | | | 707/737 |
| 2012/0001917 A1* | 1/2012 | Doganata | ........... | G06Q 10/00 |
| | | | | 345/440 |
| 2012/0185871 A1* | 7/2012 | Allen | ............ | G06F 9/546 |
| | | | | 719/313 |
| 2014/0047028 A1* | 2/2014 | Buth | ............ | G06F 9/546 |
| | | | | 709/204 |
| 2015/0006587 A1* | 1/2015 | Segaran | ........... | G06F 16/9024 |
| | | | | 707/798 |
| 2015/0149535 A1* | 5/2015 | Howard | ........... | H04L 67/34 |
| | | | | 709/203 |

OTHER PUBLICATIONS

Anonymous, Automatic Feedback Collection on Automated Processes via a Collaborative Method, ip.com No. 000218790, Jun. 7, 2012.

Anonymous, Intelligent Business Processing and Management System, ip.com No. 000226894, Apr. 23, 2013.

\* cited by examiner

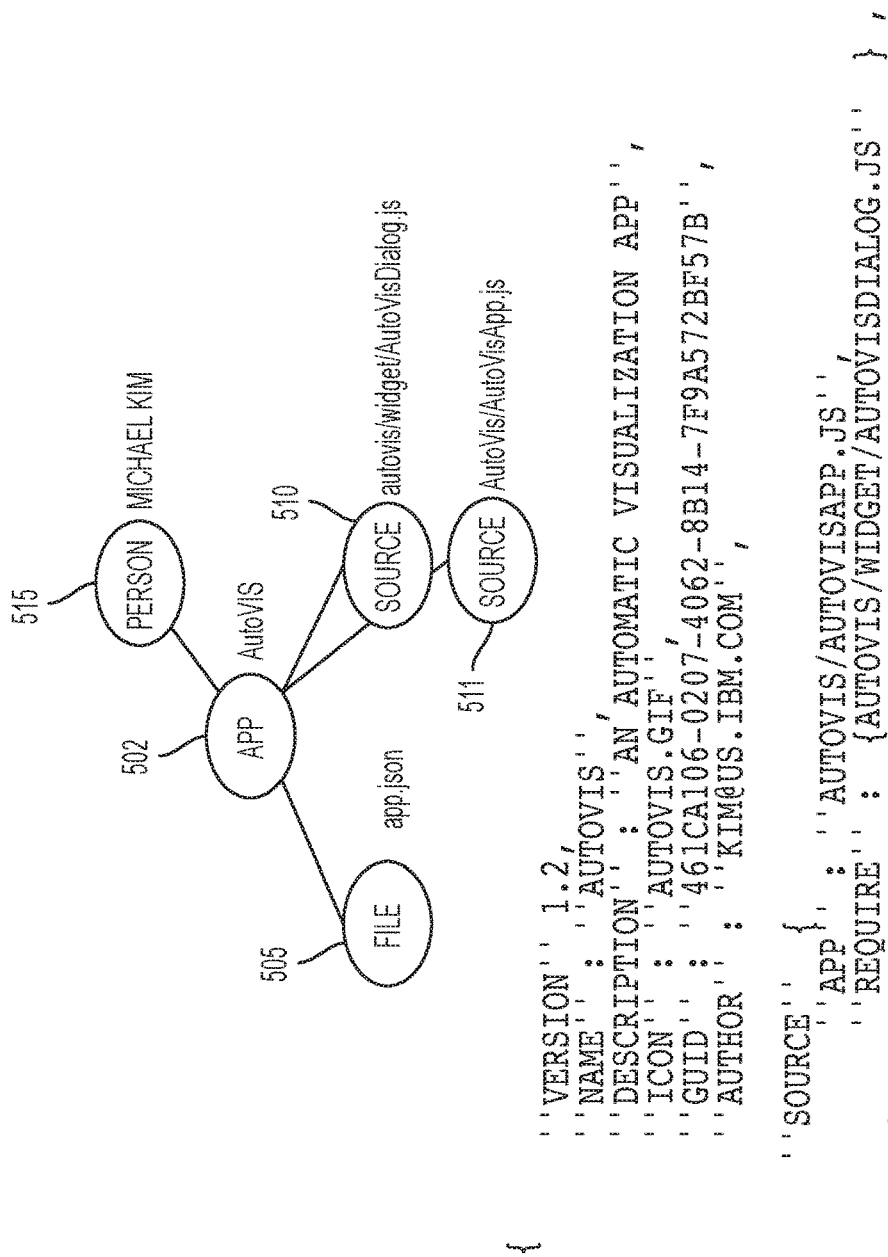

FIG. 6

SYSTEM AND METHOD TO AUTOMATE PROVENANCE-AWARE APPLICATION EXECUTION

BACKGROUND OF THE INVENTION

The present invention generally relates to a system for collaborative data analysis. More particularly, the present invention relates to automation of provenance-aware application execution.

Computer applications that consume and produce data may be invoked in sequences in which the output of one application becomes the input to another. To ensure trust and reproducibility, it may be critical for users of the applications to understand the provenance of input and output as well as other parameters of execution and understand the process that led to a particular result. This provenance information may be difficult to capture when applications are invoked in an ad-hoc manner.

As can be seen, there is a need for a system and method to automate provenance-aware application execution.

SUMMARY OF THE INVENTION

In one aspect, a method to support ad hoc collaboration and generation of workflows for a team of users comprises launching applications from a computer server without a predefined order; providing data from a provenance graph to the launched applications; selectively using the provided data from the provenance graph and additional input to create derived data and derived outputs; routing the derived data and the derived outputs to the provenance graph; recording, in the provenance graph, data that are input to the launched applications, and data that are output from the launched applications; recording, in the provenance graph, subsequences of the launched applications, and a history of execution of the recorded subsequences of the launched applications; querying the provenance graph, by a user, to select one of the recorded subsequences of the launched applications; automatically recommending execution of a plurality of the recorded subsequences of the launched applications, based on the history of execution of the recorded subsequences of the launched applications; generating at least one new subsequence of the launched applications from the selected subsequence of the launched applications, and from the recommended subsequences of the launched applications; creating a new application with the selected subsequence of the launched applications and the recommended subsequences of the launched applications; launching the newly created application; and storing the newly created application in a catalog of applications for use by the user.

In another aspect, a method to support ad hoc collaboration and generation of workflows for a team of users comprises creating a catalog of applications and storing them on a computer server; launching the applications in the catalog; recording in a provenance graph, data that are input to the launched applications, and data that are output from the launched applications; selecting, by a user, an application from the catalog of applications; creating a note node in the provenance graph, and storing in the note node comments about the selected application, and storing in the note node invocation data for the selected application; assigning parameters for the selected application based on an execution history of the catalog of applications, and based on input from a user; storing the assigned parameters for the selected application in the note node; and completing execution of the selected application using the assigned parameters stored in the note node.

In another aspect, a computer program product for supporting ad hoc collaboration and generation of workflows for a team of users comprises a computer readable storage medium having program instructions embodied therewith, the program instructions executable by a computer to: execute applications from a computer server; share input and output data from the executed applications among the executed applications; send data from a provenance graph to those executed applications; selectively use the data from the provenance graph and additional input to create derived data and derived outputs; route the derived data and derived outputs to the provenance graph; automatically record relationship information for the executed applications in the provenance graph, wherein the relationship information includes data describing a relationship between the executed applications; record in the provenance graph subsequences of the executed applications and a history of execution of the recorded subsequences of the executed applications; detect changes to the relationship information for the executed applications; store changes to the relationship information for the executed applications in the provenance graph; query the provenance graph, by one of the users, to select one of the recorded subsequences of the executed applications; automatically recommend execution of at least one of the recorded subsequences of the executed applications based on a history of execution of the recorded subsequences of the executed applications; create a new application with the selected subsequence of the executed applications and the recommended at least one of the subsequences of the executed applications; launch the newly created application; and store the newly created application in a catalog of applications for use by the users.

These and other features, aspects and advantages of the present invention will become better understood with reference to the following drawings, description and claims.

BRIEF DESCRIPTION OF THE DRAWINGS

FIG. 4 illustrates a flowchart of a method for registration of applications for use in the system of FIG. 1;

FIG. 5 illustrates a flowchart and sample code created as a result of registering an application for the system of FIG. 1;

FIG. 6 illustrates a sample homepage for use with the system of FIG. 1;

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention generally provide a system and method to automate provenance-aware application execution. This invention enables a computer to operate efficiently by transparently or automatically capturing provenance data that describe how applications were executed. The invention may also automatically record provenance data of the applications for later execution by the applications, and for later decision of when to execute one of the applications, or when to execute a subsequence of one of the applications.

Figure 1:
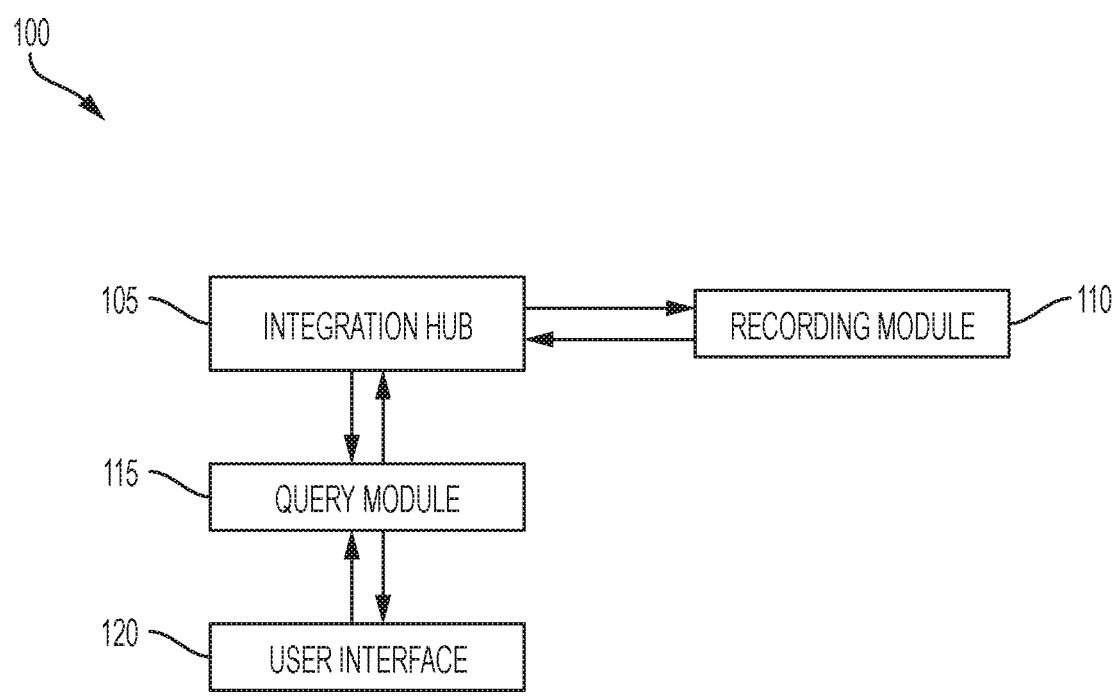
FIG. 1 illustrates a top view of a system of automating provenance-aware applications.

As shown in FIG. 1, a system 100 may include an integration hub 105, a recording module, 110, a query module 115, a user interface 120, and a dataset including inputs and outputs of applications. The integration hub 105 may include a computer such as a server including a computer processor configured to create and store a provenance graph of a dataset. Provenance information may be all the steps taken by one of the applications prior to an output of one of the applications listed in the dataset. The integration hub 105 may act as a controller for the system 100. The recording module 110 may be included on the same computer as the integration hub, or on a different computer. The recording module 110 may be configured to automatically record provenance information, and send changes to the provenance information for the dataset to the integration hub 105 in the provenance graph. The query module 115 may be included on the same computer as the integration hub, or on a different computer. The query module 115 may be configured to execute applications referred to in the provenance graph. As an example, the query module 115 may execute or re-execute a sequence or subsequence of one of the applications after a change to provenance information for the dataset. The query module 115 may accept input through a user interface 120 from a user. In an embodiment, the user may input a query through the query module regarding the dataset on the integration hub 105. The query may be, for example, regarding provenance of the dataset across all users of the system. The query may also be about the provenance of the dataset across all applications referred to in the provenance graph.

Figure 2:
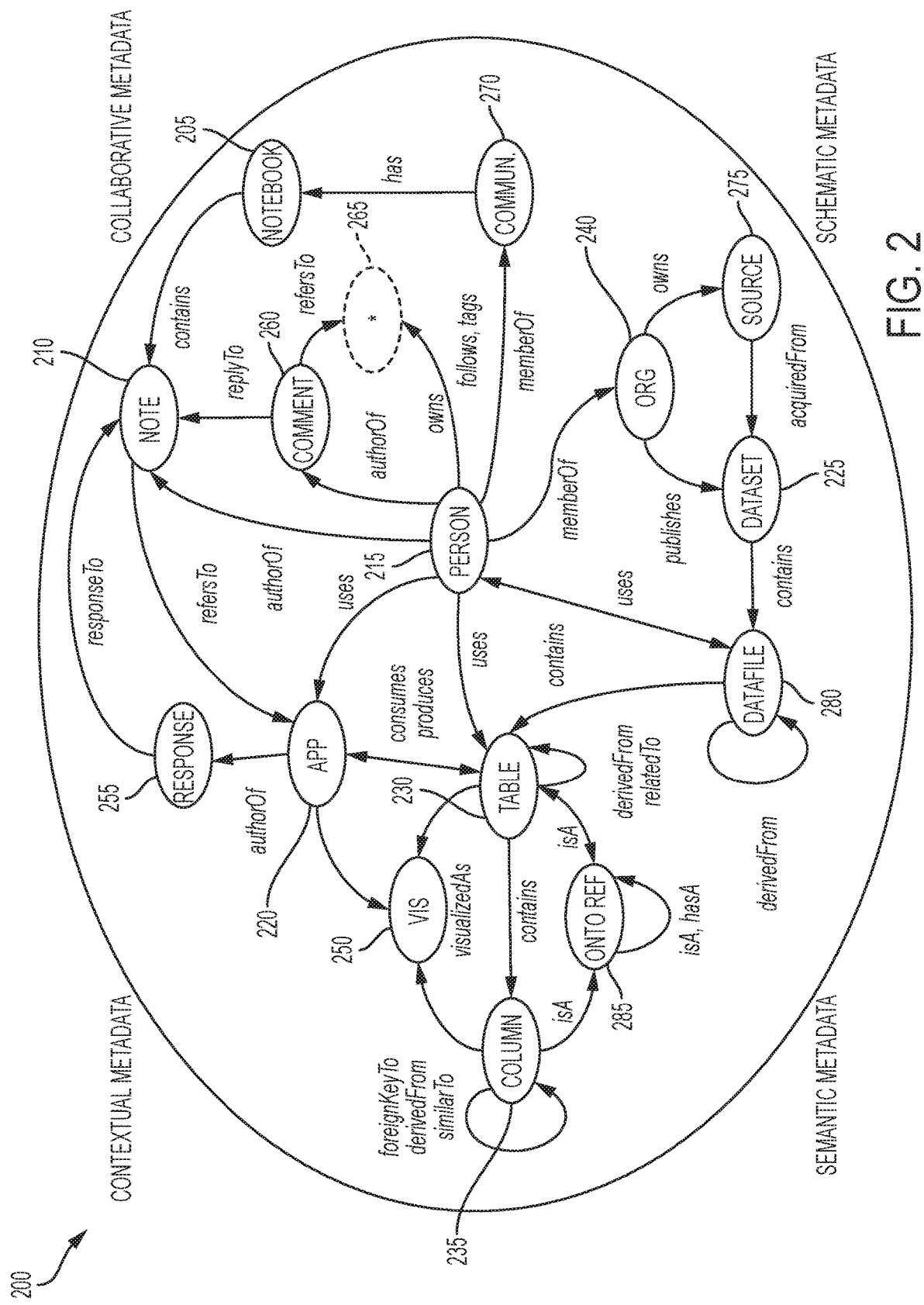
FIG. 2 illustrates a graph for use in the system of FIG. 1.

As shown in FIG. 2, an entity relationship property graph 200 (which may be called a metadata graph and may be a provenance graph) may act as an integration hub 105 for applications and may capture contextual metadata around application invocation. While the metadata graph 200 may contain a rich set of information including semantic, schematic and social metadata, the entities that are specific to this invention may represent contextual metadata that may capture the context of application use.

Figure 3:
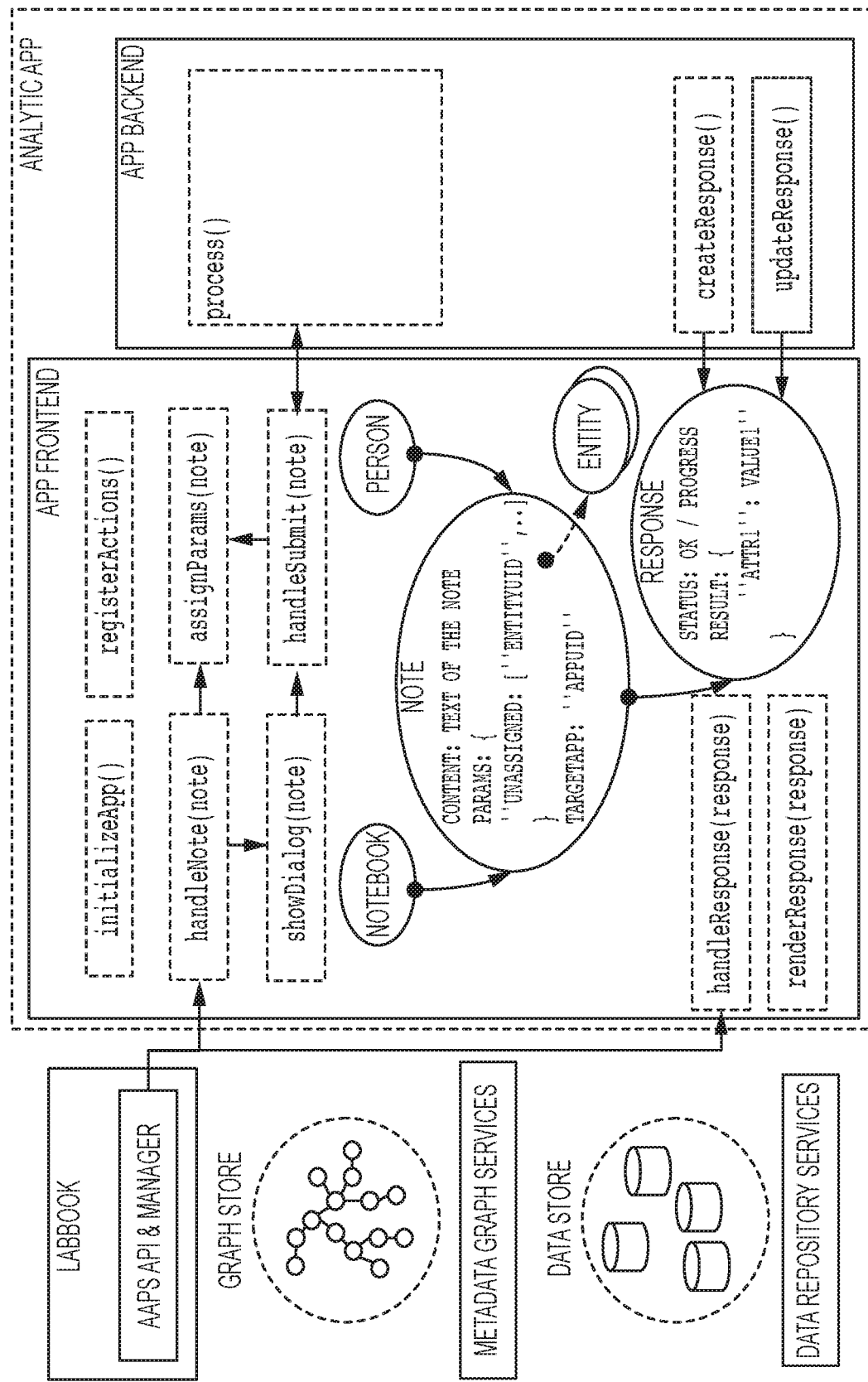
FIG. 3 illustrates a graph and application program interface for the system of FIG. 1.

A first entity 205 may be a notebook, which can conceptually capture all of the context related to a particular (collaborative) investigation, e.g., users may share their thoughts and hypotheses in notebooks where they can respond to each other, comment on results, and run applications that share input and output data. The notebook 205 entity may capture comments as well as the invocation of applications as individual notes 210, which may be additional entities represented in the graph 200. The notebook 205 may be a single note 210 or a collection of many notes 210. Notes 210 may also include all data regarding an application including a latest input from an application or output from the application. Any entity in the graph 200 may provide input data or be created as output data to an application (FIG. 3).

Other important entities in the graph 200 may include persons 215 (may be data regarding a person), who may interact with the integration hub 105 to run applications, or apps 220, which may be individually packaged applications that can be executed in the context of a note 210. In addition, the metadata graph 200 may contain other types of entities, such as datasets 225 (may be collections of data files), tables 230, columns 235 (such as a column in a table 230), organizations (ORG) 240 (may be data regarding an organization), visually displayed data (VIS) 250, response 255 (output from an application), a comment 260 (such as text input by a user), a community 270 (such as an informal group of people), a source 275 (such as a data source), a data file 280, an ontology reference 285 (such as a city) and a general entity * (265), which may refer to any entity in the graph 200.

In addition to the graph 200, the integration hub 105 may provide a set of APIs to populate and consume information stored in the graph 100. These APIs may provide a mechanism by which an application can query, retrieve and contribute entities to the graph 200.

Contributed apps may have frontend and backend components (which may be deployed to another server, for example, as a web-service). The backend components may do the heavy lifting in terms of computation and input/output, while the frontend components may support basic user interaction and integration with the UI. As shown in FIG. 3, the app may implement a set of methods that may be invoked by the integration hub 105 at appropriate times during registration, app invocation, and app execution. It may be through these methods that the provenance information may be captured.

FIG. 4 illustrates what may happen when an application is registered and deployed to the integration hub 105. First, the application may be packaged 405, typically as a set of source code and support files (such as images, templates), along with a descriptor that may list package contents and describes app metadata (e.g., name, description, icons, applicable roles). This package may be deployed 410 to the integration hub 105 by a privileged user who can upload the app package as a zip file. On upload, the integration hub 105 can validate 415 that the package is valid and complete, store the code to the repository and add the application to its catalog of applications. At this point, the application can be registered to the integration hub 105, and can be made available to all users of the hub 105 to run in the context of a notebook 205.

For example, an uploaded visualization app 502 may have created entities and relationships in the graph 200 as shown in FIG. 5. It illustrates the app descriptor file (app.json) 505 and source 510, 511 as nodes in the graph 200 ready for use. Furthermore the graph 200 may capture other metadata such as an app owner (person) 515 user at this point.

Figure 6:
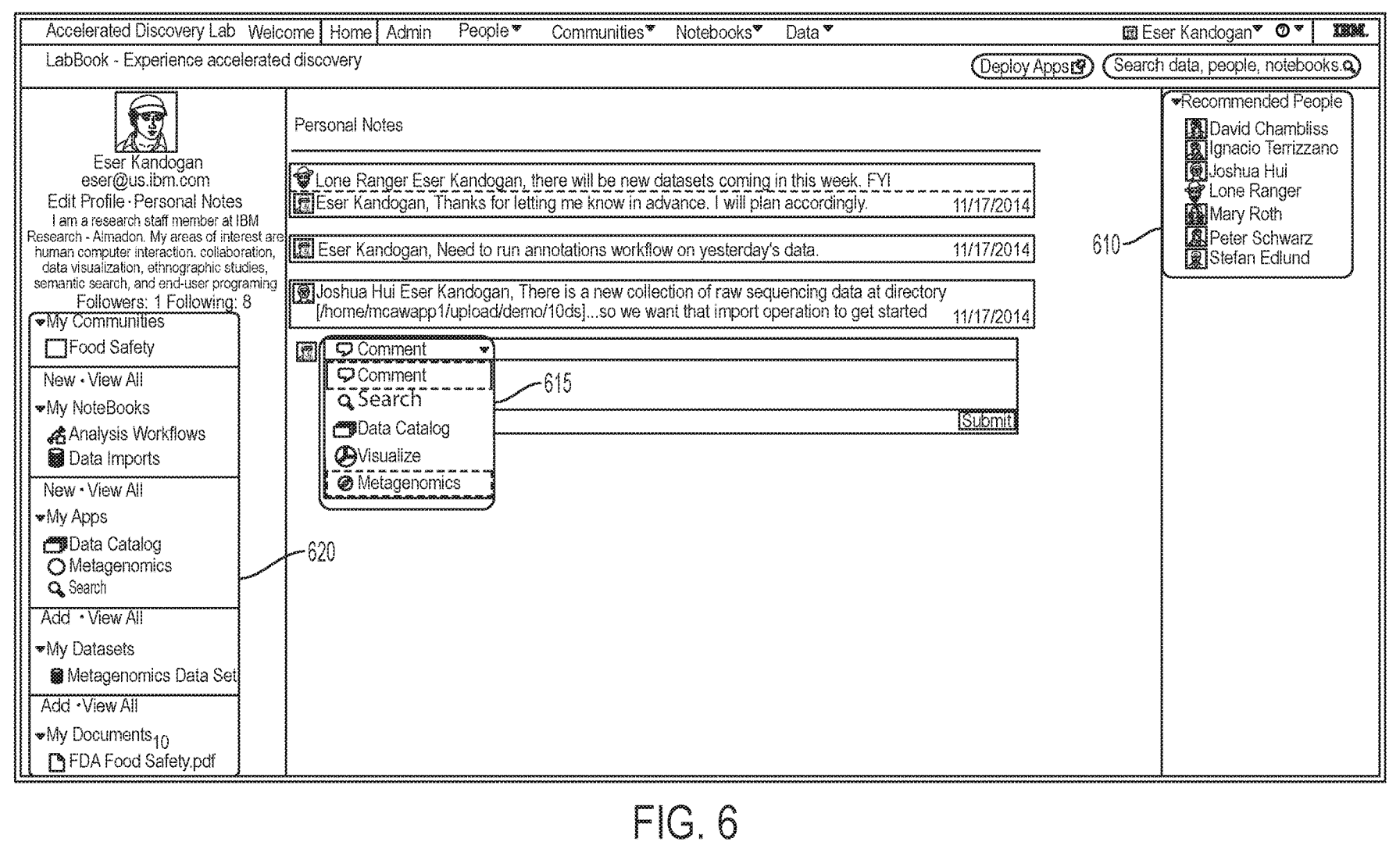

Users of the integration hub 105 may have a home page from which they can search, create notebooks and run apps from within the context of a notebook (FIG. 6). Shared notebooks may facilitate collaboration on specific tasks. Notebooks may capture contextual interaction with data, applications, and other people. Dialog may be saved and documents, images/video may be attached, and visualizations may be examined. As marked at 610, personalized recommendations may be made. As marked at 615, integrated applications may launch and capture content. As marked at 620, "My communities", "My Apps", "My Datasets" and "My Documents" provide convenient access.

Figure 8:
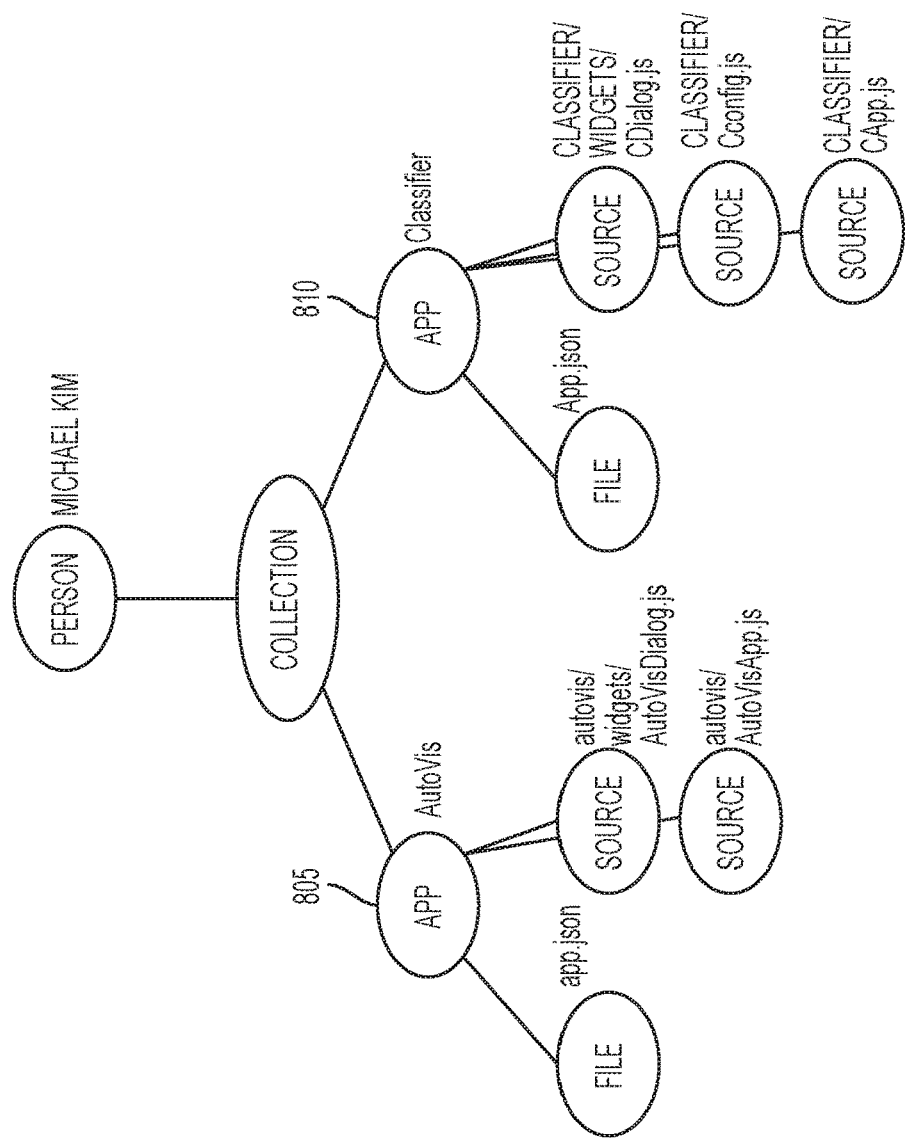
FIG. 8 is a flowchart showing a provenance graph after application initialization for use with the system of FIG. 1.
Figure 7:
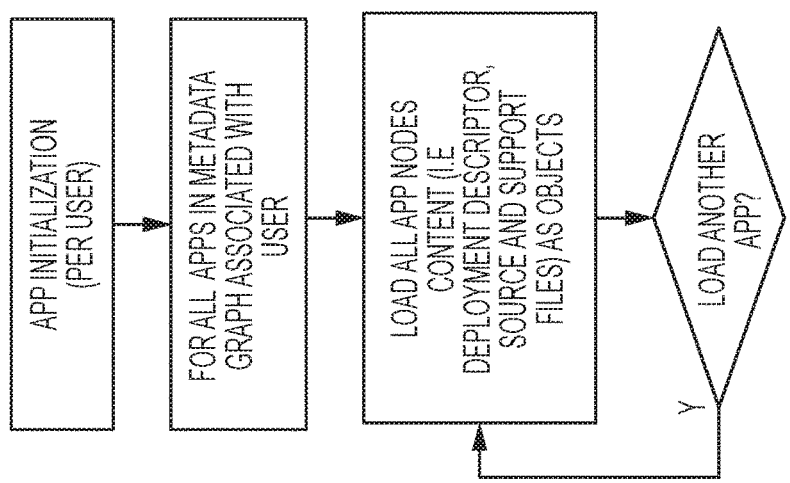
FIG. 7 is a flowchart showing application initialization for applications utilized in the system of FIG. 1.

FIG. 7 may show what happens when a user logs into the integration hub 105. The integration hub 105 may create the user's home page from content stored in the metadata graph 200, including apps, existing notebooks, and other entities associated with the user. For each app associated with the user in the metadata graph 200, the app and its resources may be loaded into the system such that a running instance is created. For example, as shown in FIG. 8, Michael Kim has access to two applications AutoVis 805 and Classifier 810. When he logs in to his homepage the app and related sources can be loaded at run time and be ready for invocation by Michael.

Figure 9:
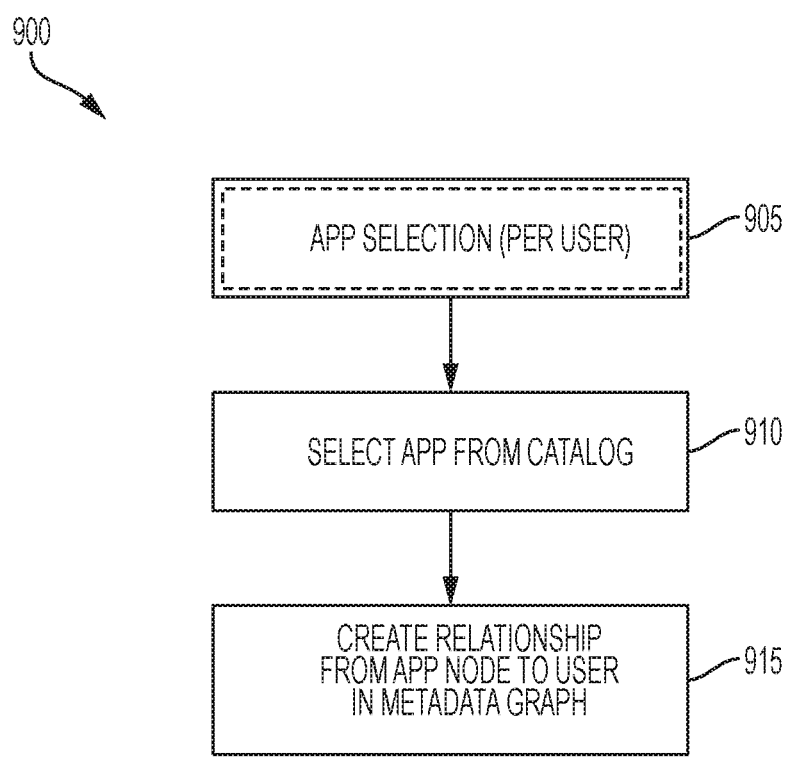
FIG. 9 is a flowchart showing a method of application selection for use with the system of FIG. 1.

FIG. 9 illustrates a process 900 of how an application can be selected 905 by a user to be added to his or her home page. The user can select 910 from a list of applications registered to the integration hub, or use a search facility to find registered applications. Once an application (app) is selected 905, the application can be added to the user's home page by creating a relationship 915 from the app to the user in the metadata graph 200. At this point, the user may be able to run the app (as well as any other apps he or she may have selected in the same way) in the context of a notebook.

In an embodiment, once the user's home page has been initialized, a user interface may allow the user to select, create and interact with his or her notebooks (FIG. 6). The user interface can display the contents of a notebook as a series of notes. The user can select one or more apps to be run in the context of a notebook, each of which is captured in the context of an individual note.

Figure 10:
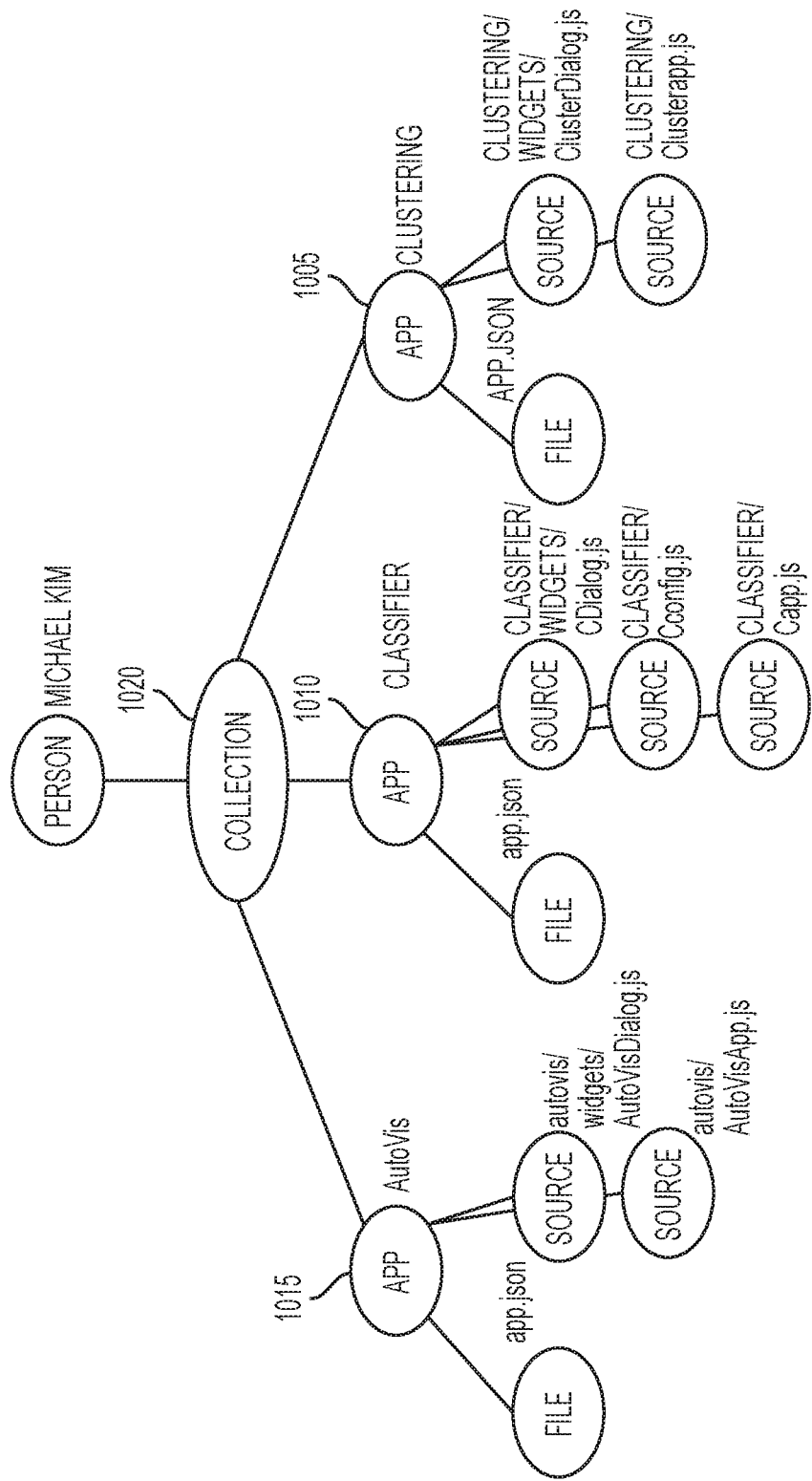
FIG. 10 is a flowchart showing the provenance graph after a "clustering" application is added for use with the system of FIG. 1.

FIG. 10 is a flowchart showing the metadata graph 200 (or provenance graph) after an application labeled "clustering" 1005 is added to an application labeled "classifier" 1010 and an application labeled "Autovis" 1015 for grouping in a "collection" 1020.

Figure 11:
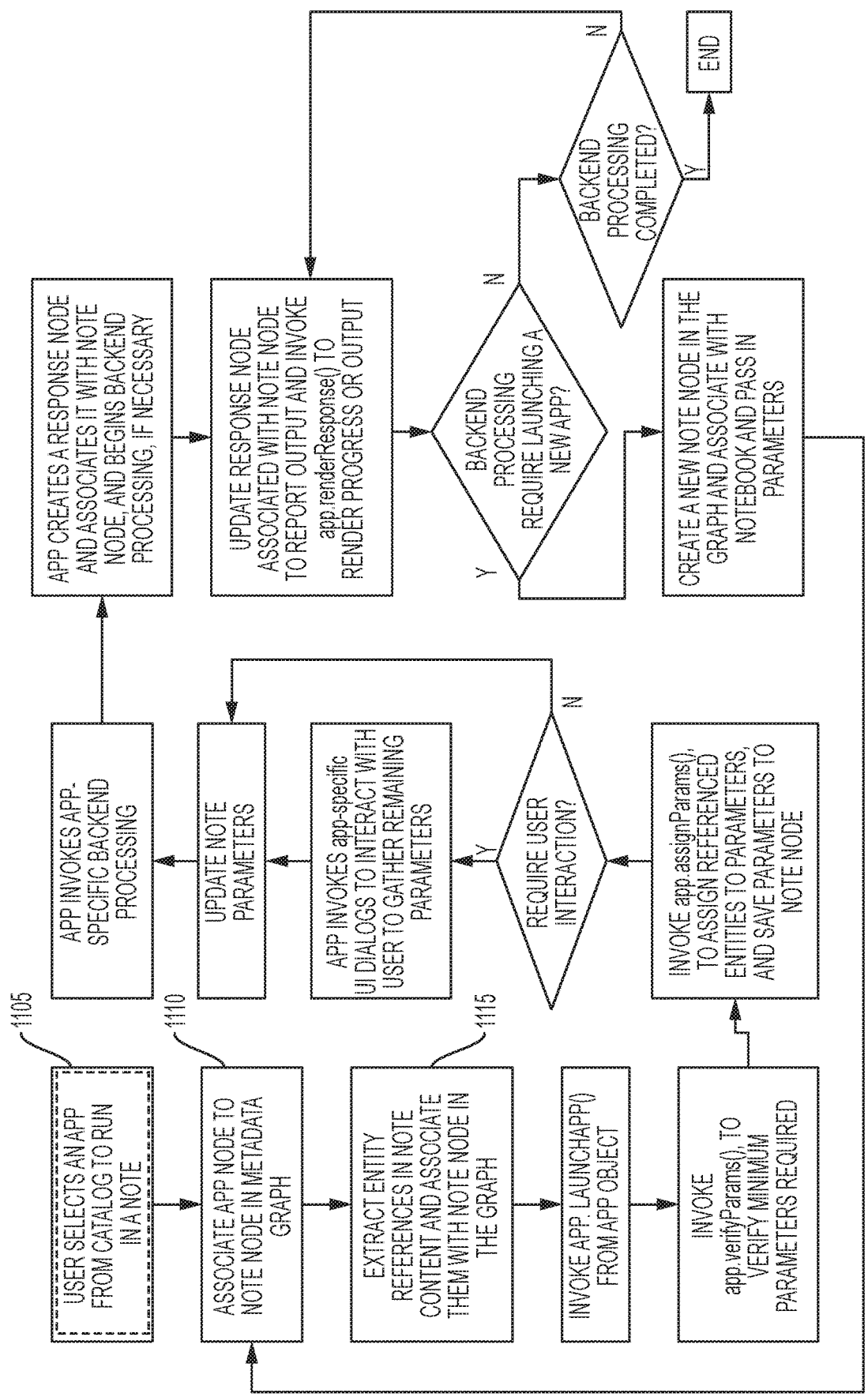
FIG. 11 is a flowchart showing a method for a user selection of an application to run in a note.

FIG. 11 describes the selection process 900 in more detail. Once the user selects 1105 an app, a relationship may be established 1110 in the metadata graph 200 between the note node and the app node. The user can add any additional information in the content of the note, including images, links, and references to other entities in the metadata graph 200, and the integration hub 105 may associate each of the entities with the note by creating relationships in the metadata graph 200.

Figure 12:
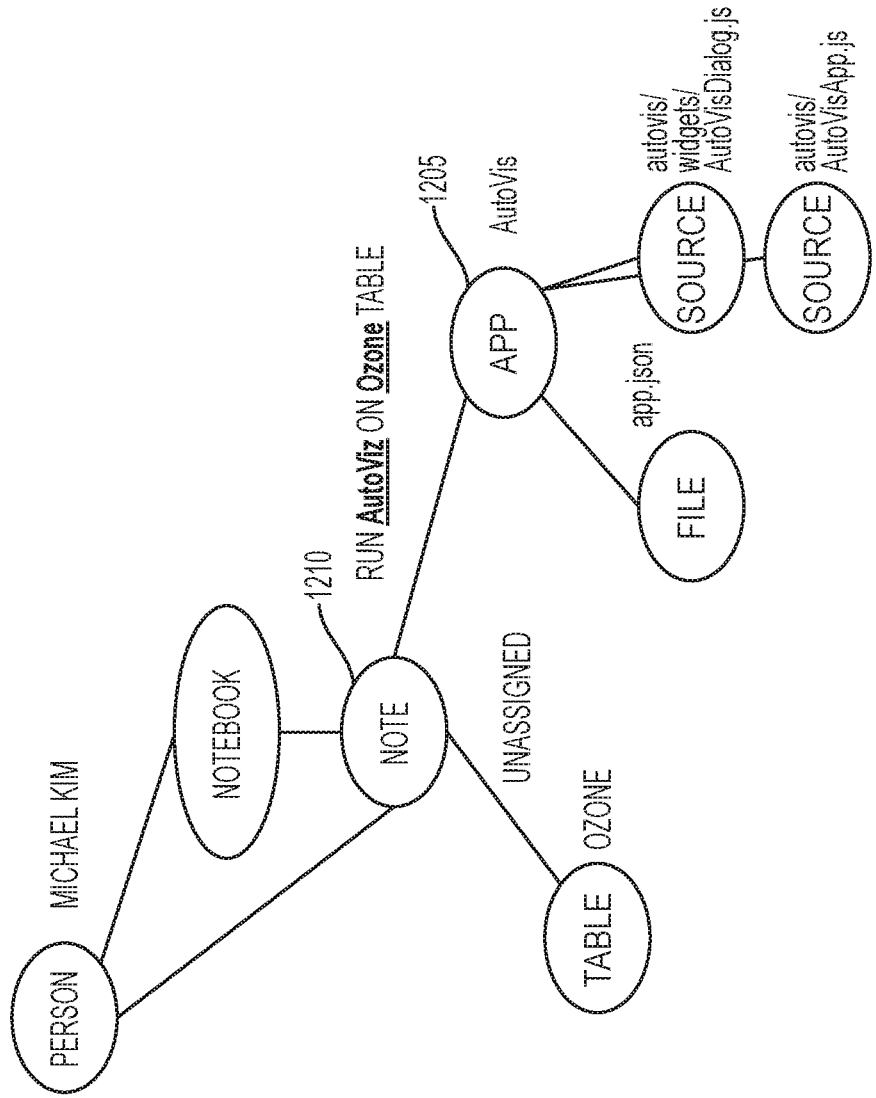
FIG. 12 is a flowchart of a note entity with unassigned parameters extracted and passed to an application.

Once the user hits submit, the integration hub 105 may extract 1115 all entity references from the note by traversing the relationships from the note to the entities, and associate them with the note entity as "unassigned" parameters. For example, in FIG. 12, Michael invoked the AutoVis app 1205, and created a note 1210 with the following content: "run AutoVizon OzoneTable". As a result AutoViz app 1205 and Ozone table entities are linked to the note 1210.

Figure 13:
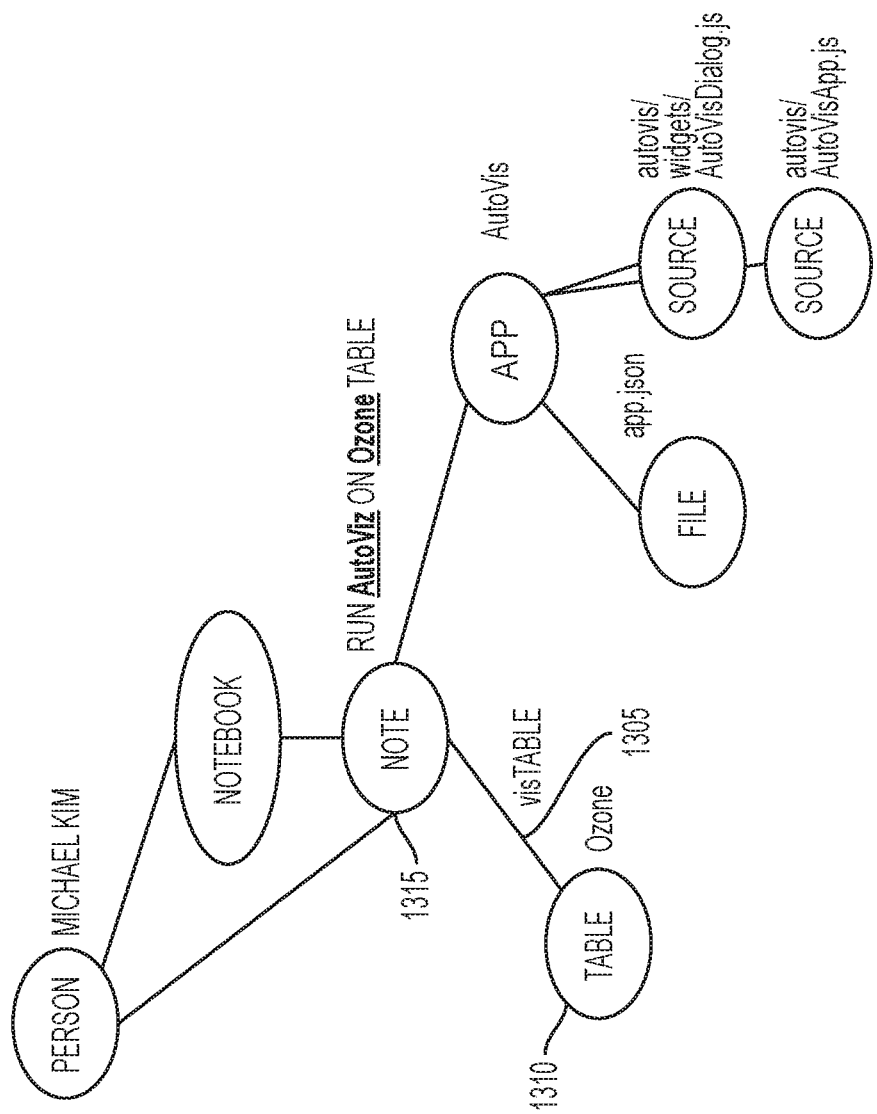
FIG. 13 is a flowchart showing a provenance graph after unassigned parameters are verified and assigned to specific parameters by the application.

The system may launch the app 1205 by invoking app.launchApp( ), and pass as input all of the references to the entities as input. Next, the integration hub 105 may invoke app.verifyParams( ) to ensure that the minimum number of parameters was provided to the app 1205, followed by an invocation to app.assignParams( ) to assign parameter values from the set of entities that were passed in as input, and to save the parameter values to the note node in the metadata graph 200. For example, in FIG. 13 the link 1305 to the Ozone table 1310 may now be marked as "visTable" suggesting that this may be the table 1310 to visualize.

Figure 14:
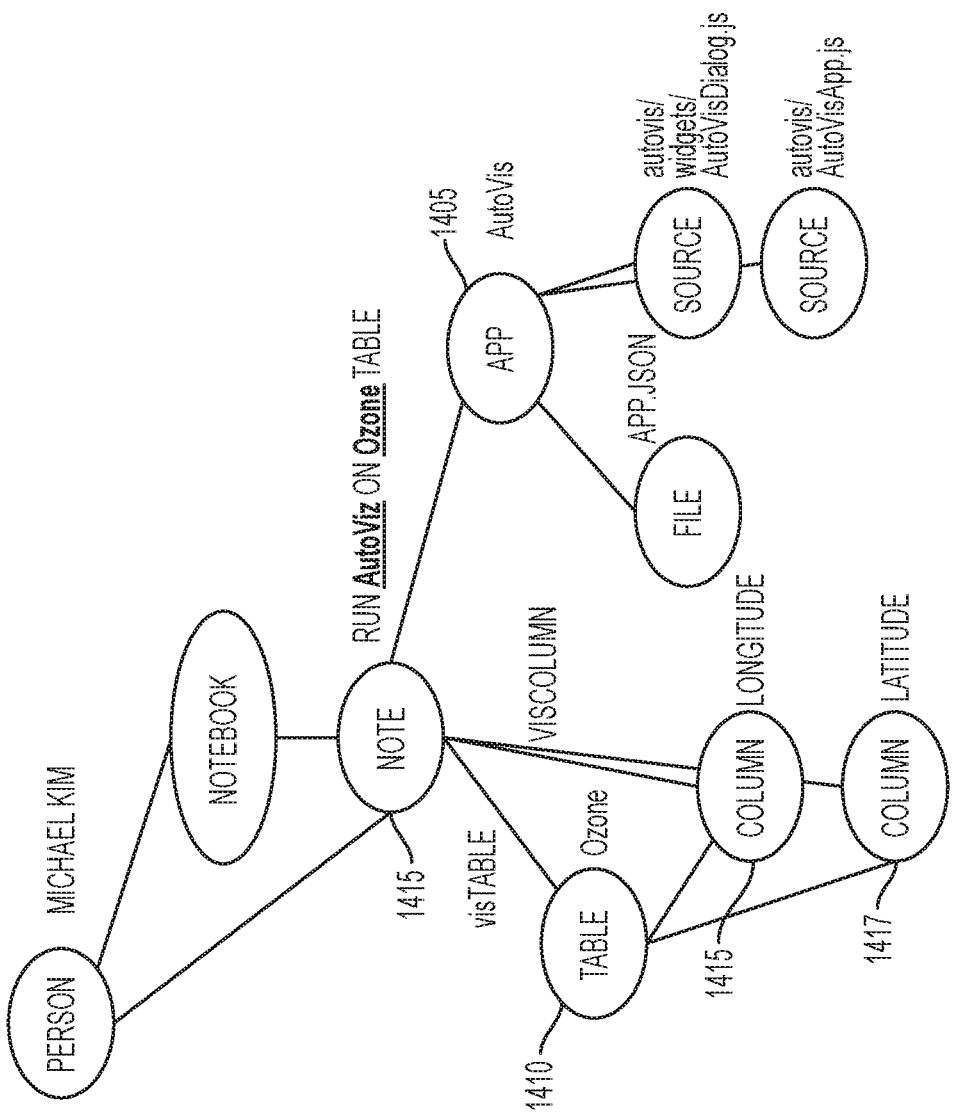
FIG. 14 is a flowchart showing the provenance graph after additional parameters are obtained from the user and added to the note entity.

In an embodiment, as illustrated in FIG. 14, it may be the case that additional user input may be required to provide additional parameters. In this case, the app 1405 can display app-specific dialog boxes to interact with the user to obtain the remaining input. For example, AutoViz app 1405 may require the user to specify the columns 1415, 1417 of the table 1410 to visualize and bring up a dialog to select the columns (1415, 1417). Once the user selects the columns (1415, 1417), these columns (1415, 1417) may be associated with the note, as shown in FIG. 14. The graph 200 may be the mechanism to communicate with the application 1405 as the graph 200 stores both inputs and outputs of the application for multiple sets of input and/or output data.

Figure 15:
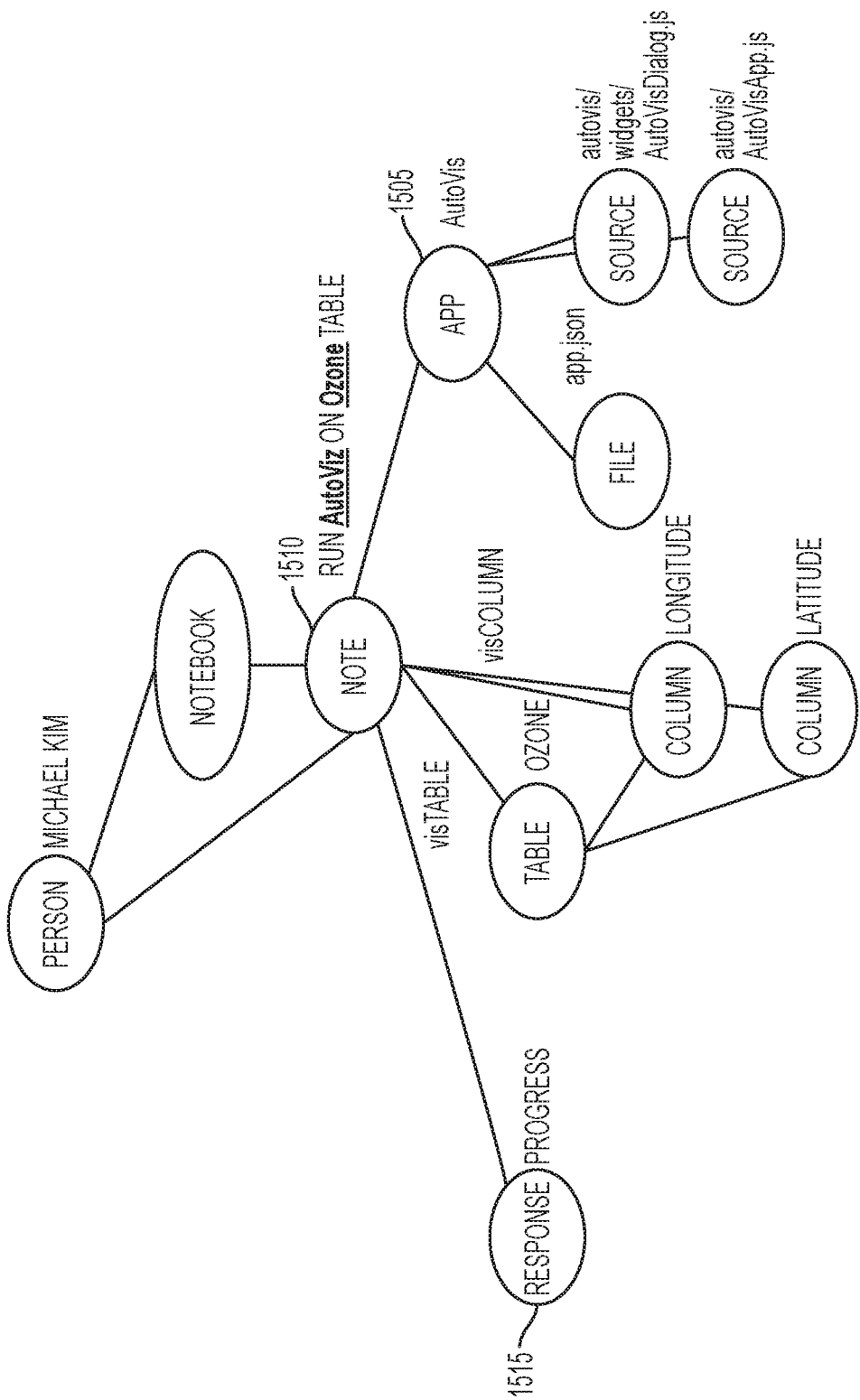
FIG. 15 is a flowchart showing the provenance graph after a provenance node is created and linked to the note, reporting progress information to the user.
Figure 16:
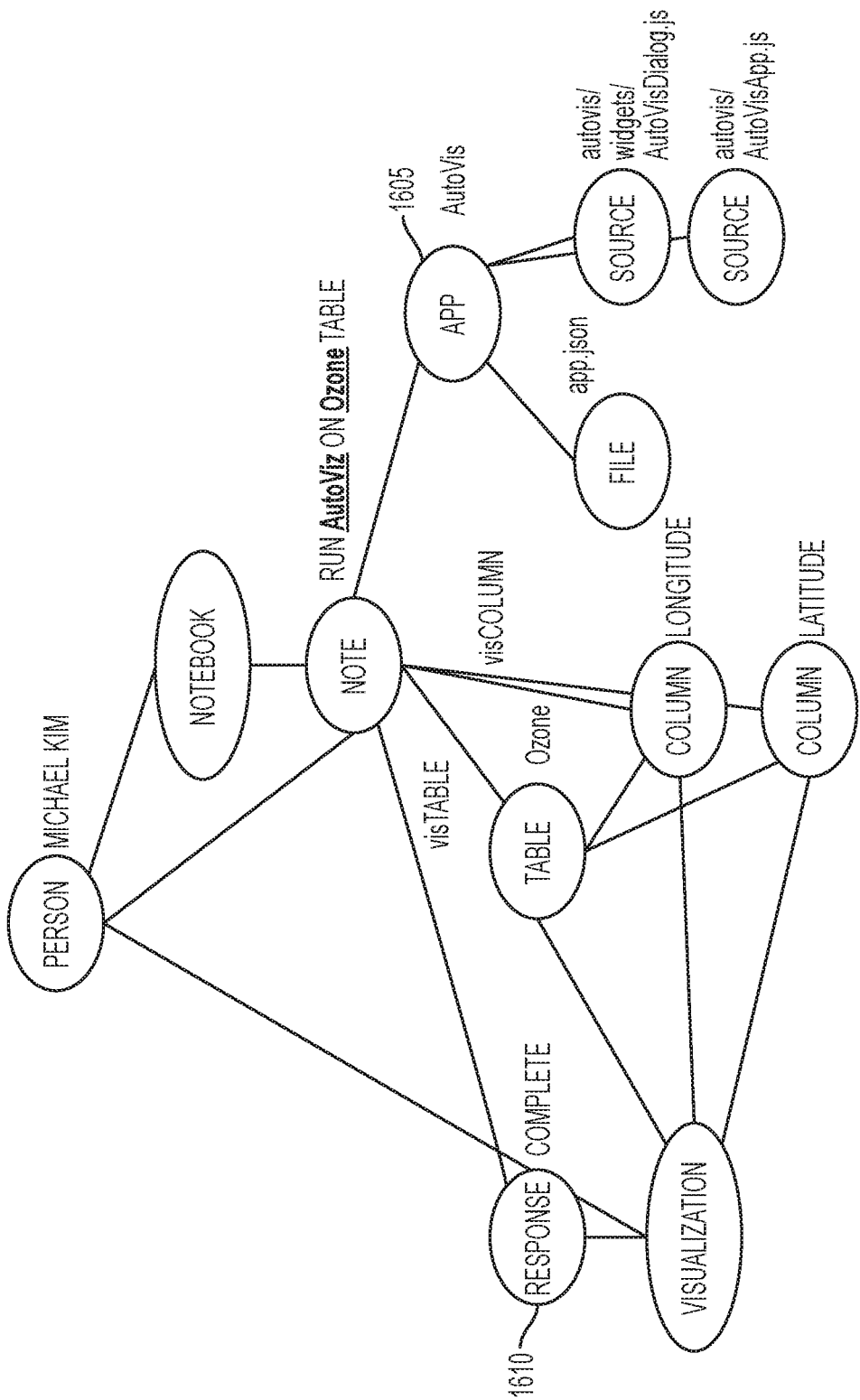
FIG. 16 is a flowchart of the provenance graph showing after a response has been marked as complete and new nodes have been added and linked to the note and other related nodes.

In an embodiment, as illustrated in FIG. 15, once all input data have been acquired, the application (app) 1505 can invoke specific backend logic to process the input. The app 1505 can periodically report status or deliver output data by adding or updating a response node 1515 associated with the note 1510. For example, the AutoViz app 1505 can immediately send a progress response 1515 and update it at regular intervals. Once the app 1505 completes processing, it can update the response to mark the status as complete, as shown in FIG. 16. On completion the app 1605 may also add additional nodes in the graph 200, if necessary, for example a visualization and add the necessary relationships.

The integration hub 105 may monitor the graph 200, and when a new response node 1610 is detected, it may invoke app.handleResponse( ) to process it. The response 1610, for example, may include providing updated status to the user, or posting of data. The app's renderResponse( ) may then render such application-specific output back to the notebook.

When a response 1610 is marked as complete, it may be necessary to launch a new app with the context of the existing app. In this case, a new note may be created in the metadata graph 200, associated with the new app, and the process of passing in parameters and context may be repeated for the new app.

Figure 17:
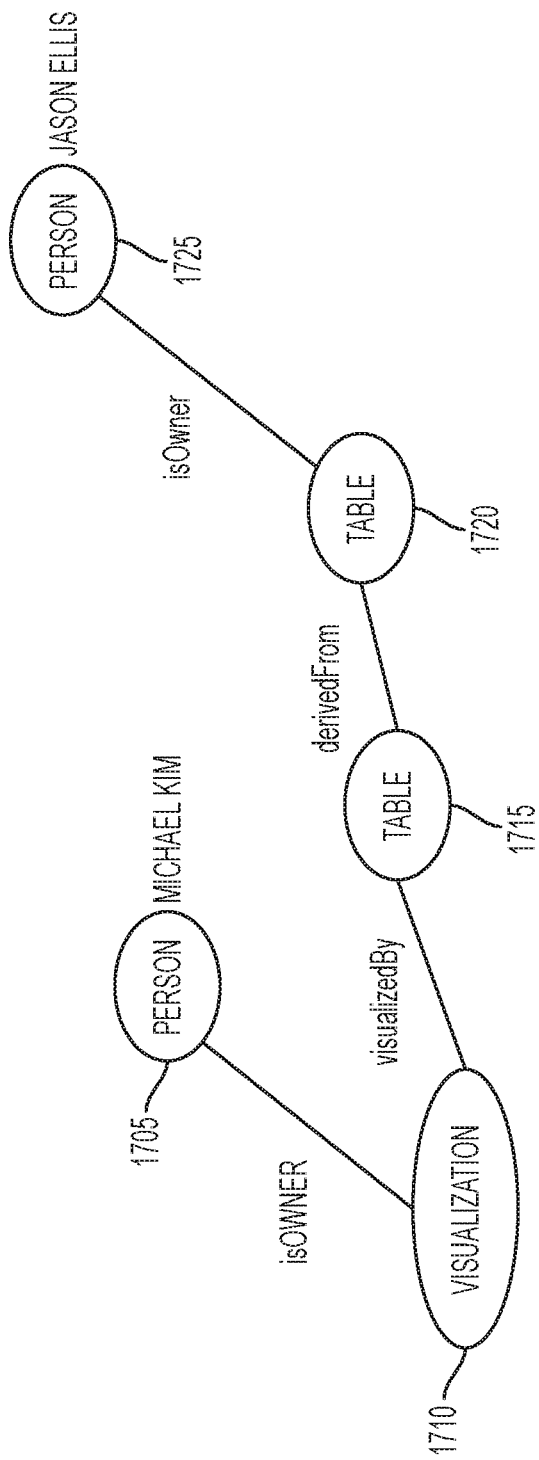
FIG. 17 is a flowchart of the provenance graph after a person has created a visualization of a table in the provenance graph.

In an embodiment illustrated by FIG. 17, the provenance of a dataset or datasets across sequence of apps can be derived by traversing the graph 200 or by using a standard graph query language. For example, derived datasets may have their original dataset linked through a derivedFrom relationship, and owners can be traced by an isOwner relationship, etc. In this example, Michael Kim 1705 created a visualization 1710 of a table 1715 derived from another table 1720 owned by Jason Ellis 1725. Graph query APIs may allow the apps to traverse the graph 200 via known relationships. This information can be extracted by directly traversing the graph 200 or via a graph query language.

Figure 18:
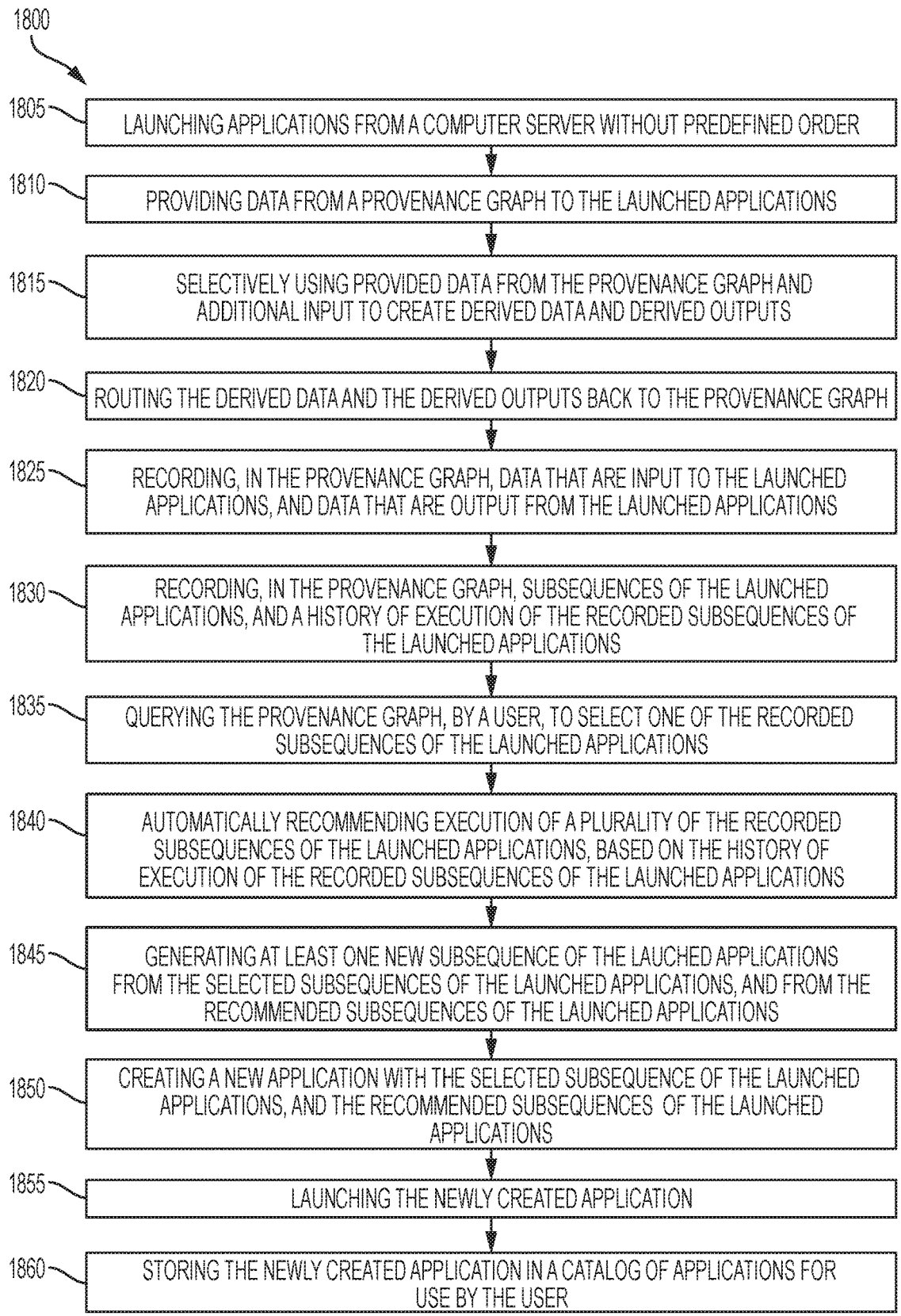
FIG. 18 is a flowchart of a method for implementing the system of FIG. 1.

In FIG. 18 a method 1800 to automate provenance-aware application execution may include a step 1805 of launching applications from a computer server without a predefined order. A step 1810 may include providing data from a provenance graph to the launched applications. A step 1815 may include selectively using the provided data from the provenance graph and additional input to create derived data and derived outputs. The derived data and derived outputs may be derived from relationships between entities (such as relationships between data files), and data associated with the entities, in the provenance graph. A step 1820 may include routing the derived data and the derived outputs back to the provenance graph. A step 1825 may include recording, in the provenance graph, data that are input to the launched applications and data that are output from the launched applications. A step 1830 may include recording, in the provenance graph, subsequences of the launched applications, and a history of execution of the recorded subsequences of the launched applications. A step 1835 may include querying the provenance graph, by a user, to select one of the recorded subsequences of the launched applications. A step 1840 may include automatically recommending execution of a plurality of the recorded subsequences of the launched applications, based on the history of execution of the recorded subsequences of the launched applications. In an embodiment, the recommendation of execution of the plurality of the recorded subsequences may also be based in whole or in part on a popularity of the recorded subsequences by the launched applications in the past. In an embodiment, the recommendation of execution of the plurality of the recorded subsequences may also be based in whole or in part on what social organization a user, who performed one of the recorded subsequences in the past, belongs to. A step 1845 may include generating at least one new subsequence of the launched applications from the selected subsequences of the launched applications, and from the recommended subsequences of the launched applications. A stop 1850 may include creating a new application with the selected subsequence of the launched applications, and the recommended subsequences of the launched applications. A step 1855 may include launching the newly created application. A step 1860 may include storing the newly created application in a catalog of applications for use by the user.

Figure 19:
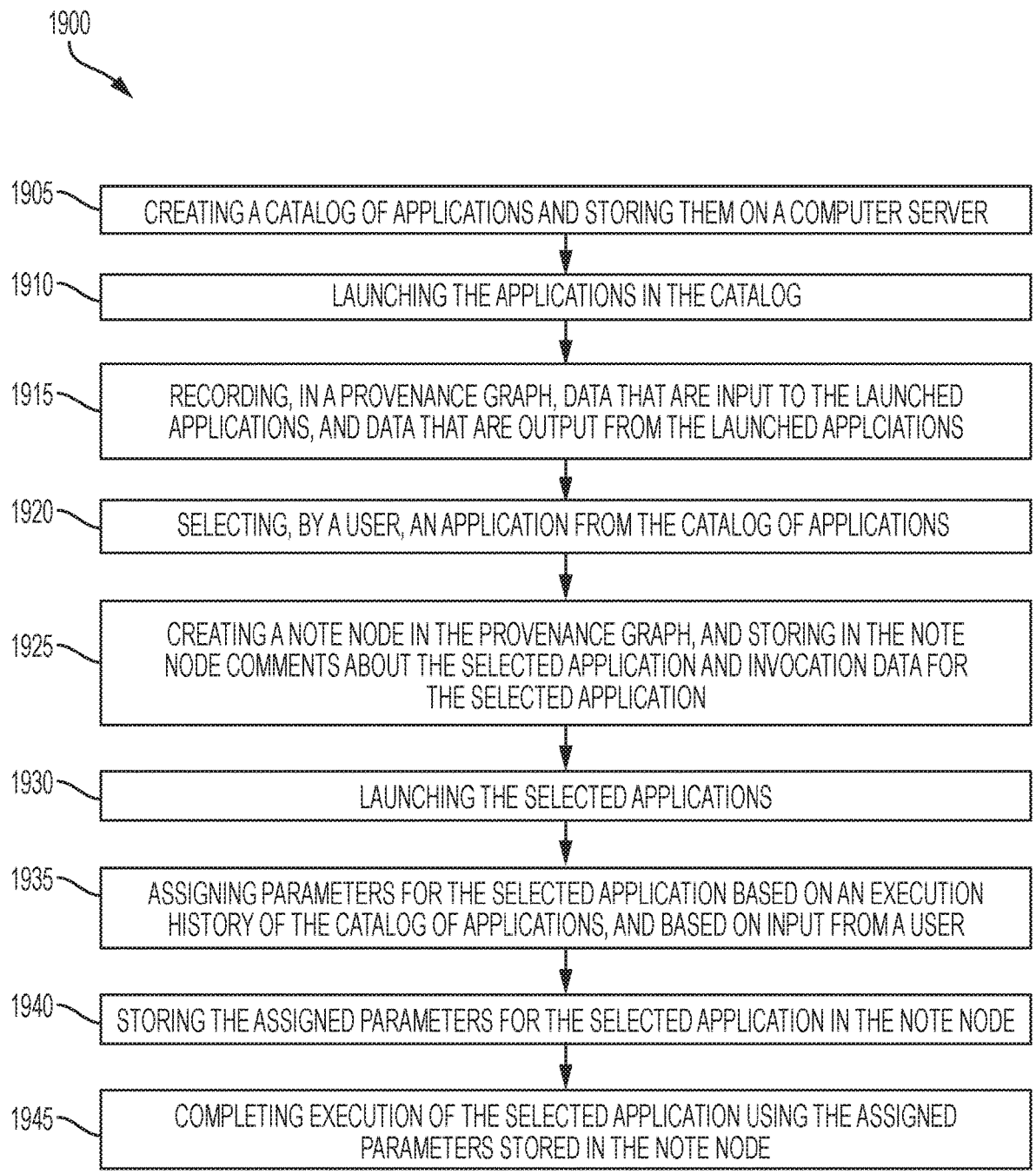
FIG. 19 is a flowchart of another method for implementing the system of FIG. 1.

In FIG. 19, a method 1900 may include a step 1905 of creating a catalog of applications and storing them on a computer server. A step 1910 may include launching the applications in the catalog. A step 1915 may include recording, in a provenance graph, data that are input to the launched applications, and data that are output from the launched applications. A step 1920 may include selecting, by a user, an application from the catalog of applications. A step 1925 may include creating a note node in the provenance graph, and storing in the note node comments about the selected application and storing in the note node invocation data for the selected application. A step 1930 may include launching the selected application. A step 1935 may include assigning parameters for the selected application based on an execution history of the catalog of applications, and based on input from a user. A step 1940 may include storing the assigned parameters for the selected application in the note node. A step 1945 may include completing execution of the selected application using the assigned parameters stored in the note node.

Figure 20:
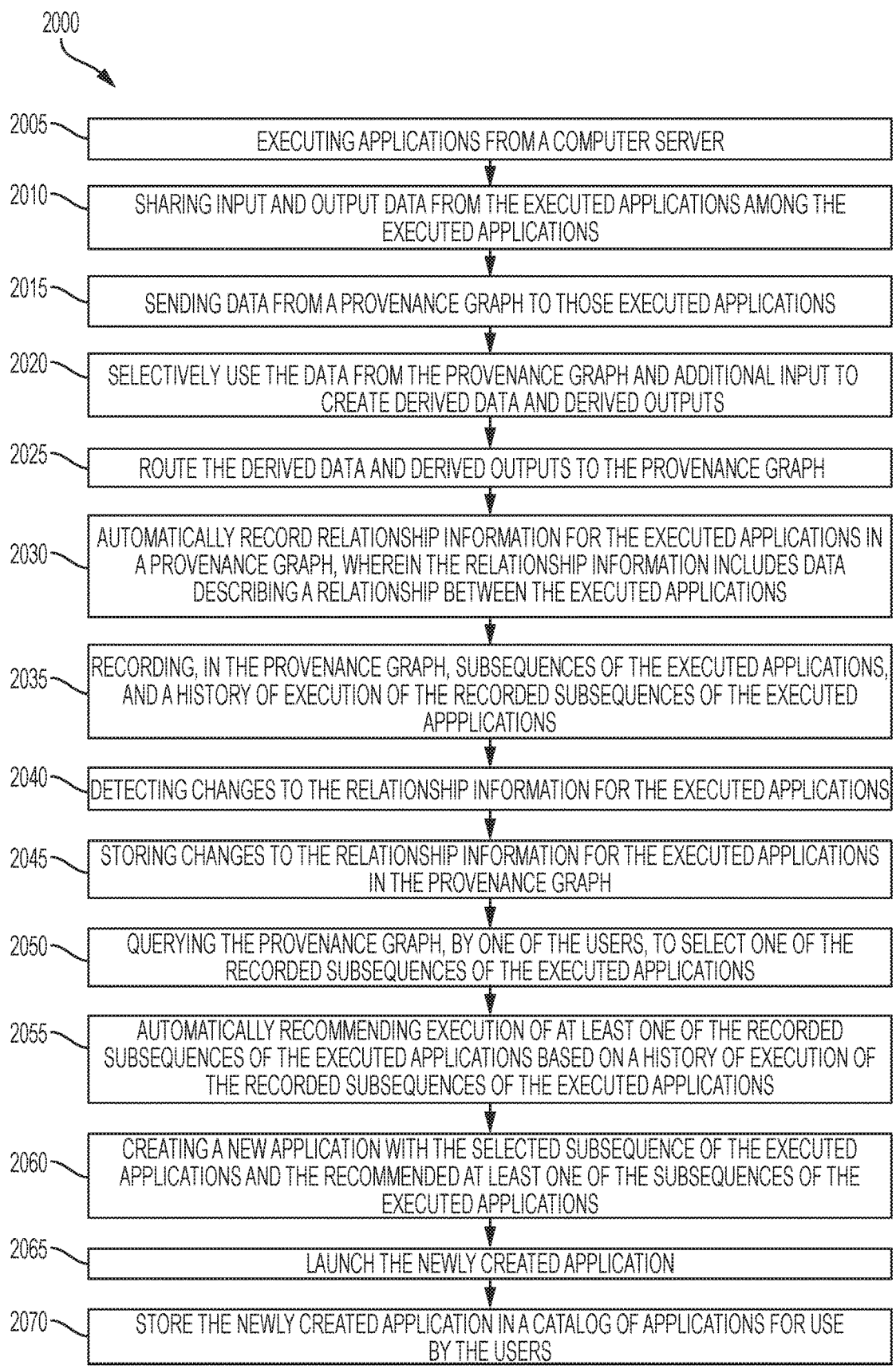
FIG. 20 is a flowchart of a further method for implementing the system of FIG. 1.

In FIG. 20, a method 2000 may include a step 2005 of executing applications from a computer server. A step 2010 may include sharing input and output data from the executed applications among the executed applications. A step 2015 may include sending data from a provenance graph to those executed applications. A step 2020 may include selectively using the data from the provenance graph and additional input to create derived data and derived outputs. A step 2025 may include routing the derived data and derived outputs to the provenance graph. A step 2030 may include automatically recording relationship information for the executed applications in a provenance graph, wherein the relationship information includes data describing a relationship between the executed applications. A step 2035 may include recording in the provenance graph subsequences of the executed applications and a history of execution of the recorded subsequences of the executed applications. A step 2040 may include detecting changes to the relationship information for the executed applications. A step 2045 may include storing changes to the relationship information for the executed applications in the provenance graph. Changes to the relationship information may include changes to the content and/or location of the relationship information. For example, relationship information associated with one entity in the provenance graph may be relocated to associate with another entity on the provenance graph. A step 2050 may include querying the provenance graph, by one of the users, to select one of the recorded subsequences of the executed applications. A step 2055 may include automatically recommending execution of at least one of the recorded subsequences of the executed applications based on a history of execution of the recorded subsequences of the executed applications. A step 2060 may include creating a new application with the selected subsequence of the executed applications and the recommended at least one of the subsequences of the executed applications. A step 2065 may include launching the newly created application. A step 2070 may include storing the newly created application in a catalog of applications for use by the users.

Computer applications that consume and produce data may be invoked in sequences in which an output of one application may become an input to another application. To ensure trust and reproducibility, it may be critical for users of the applications to understand the provenance of data and understand the process that led to a particular result. This provenance information may be difficult to capture when applications are invoked in an ad-hoc manner. In an embodiment, the method 1800 may include a provenance-aware framework in which applications can be executed in such a way that provenance information is automatically recorded and captured in a central heterogeneous graph, allowing end users to ask queries about the provenance of a dataset across applications and users, as well as re-execute sequences or subsequences of apps to reproduce an output. The context of one app may be passed to a next app through the graph 200 where applications may create note entities in the graph 200 with input and output parameters referencing entities (such as applications) in the graph 200. The applications may be executed as a result of user action, such as a user initiating an application at a specified point in the provenance graph, with specified inputs. The input to one of the applications may be less than completely specified at a time that one of the applications is executed. For example, there may only a partial input of data to the one of the applications prior to the one of the applications being executed. The applications may package state and progress information to a repository such as the provenance graph as the applications execute. Execution of one of the applications, or a sequence or subsequence of the one of the applications may be based on a threshold execution speed or threshold execution accuracy of all the applications, or of a sequence or subsequence of the one of the applications.

An input to one of the applications may be provided by an entity-relationship graph such as the provenance graph 200. An entity may be, for example, a data file or data files, or identification data for an item or a person. One of the applications may validate input provided by the integration hub 105 and interact with a user to retrieve other unspecified input. This provenance-aware execution of applications may make execution of a computer more efficient and more accurate, as the execution is based on execution results of applications being executed, as seen in the recorded provenance information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method to support ad hoc collaboration and generation of workflows for a team of users, the method comprising:
    launching applications from a computer server without a predefined order;
    providing data from a provenance graph to the launched applications;
    selectively using the provided data from the provenance graph and additional input to create derived data and derived outputs;
    routing the derived data and the derived outputs to the provenance graph;
    recording, in the provenance graph, data that are input to the launched applications, and data that are output from the launched applications;
    recording, in the provenance graph, subsequences of the launched applications, and a history of execution of the recorded subsequences of the launched applications;
    querying the provenance graph, by a user, to select one of the recorded subsequences of the launched applications;
    automatically recommending execution of a plurality of the recorded subsequences of the launched applications, based on the history of execution of the recorded subsequences of the launched applications;
    generating at least one new subsequence of the launched applications from the selected subsequence of the launched applications, and from the recommended subsequences of the launched applications;
    creating a new application with the selected subsequence of the launched applications and the recommended subsequences of the launched applications;
    launching the newly created application; and
    storing the newly created application in a catalog of applications for use by the user.

2. The method of claim 1, including recording in the provenance graph comments on data that are input to the launched applications.

3. The method of claim 1, including recording in the provenance graph comments on data that are output from the launched applications.

4. The method of claim 1, wherein one of the launched applications stores state and progress information of itself to the provenance graph.

5. The method of claim 1, wherein an input to one of the launched Applications is an entity stored in the provenance graph.

6. The method of claim 1, wherein one of the launched applications validates input to itself and interacts with one of the users.

7. A method to support ad hoc collaboration and generation of workflows for a team of users, the method comprising:
    creating a catalog of applications and storing them on a computer server;
    launching the applications in the catalog;
    recording in a provenance graph, data that are input to the launched applications and a corresponding source of the data that are input into the launched applications, and data that are output from the launched applications;
    recording, in the provenance graph, subsequences of the launched applications, and a history of execution of the recorded subsequences of the launched applications;
    querying the provenance graph, by a user, to select one of the recorded subsequences of the launched applications;
    automatically recommending execution of a plurality of the recorded subsequences of the launched applications, based on the history of execution of the recorded subsequences of the launched applications;
    creating a new application with the selected subsequence of the launched applications and the recommended subsequences of the launched applications;
    selecting, by a user, an application from the catalog of applications;
    creating a note node in the provenance graph, and storing in the note node comments about the selected application, and storing in the note node invocation data for the selected application;
    assigning parameters for the selected application based on an execution history of the catalog of applications, and based on input from a user;
    storing the assigned parameters for the selected application in the note node; and
    completing execution of the selected application using the assigned parameters stored in the note node.

8. The method of claim 7, including:
    the selected application creating a response node for responding to an execution of the selected application; and
    associating the response node with the note node.

9. The method of claim 8, including:
    outputting a report of the response node to a computer display.

10. The method of claim 7, wherein a context of the selected application is stored in the provenance graph and passed to an application other than the selected application.

11. The method of claim 7, wherein the computer server is configured to allow the user to ask queries about history and ownership of the recorded data in the provenance graph.

12. The method of claim 7, wherein the provenance graph includes the current location of the selected application.

13. A computer program product for supporting ad hoc collaboration and generation of workflows for a team of users, the computer program product comprising a computer readable storage medium having program instructions embodied therewith, the program instructions executable by a computer to:
  execute applications from a computer server;
  share input and output data from the executed applications among the executed applications;
  send data from a provenance graph to those executed applications;
  selectively use the data from the provenance graph and additional input to create derived data and derived outputs;
  route the derived data and derived outputs to the provenance graph;
  automatically record relationship information for the executed applications in the provenance graph, wherein the relationship information includes data describing a relationship between the executed applications;
  record, in the provenance graph, subsequences of the executed applications and a history of execution of the recorded subsequences of the executed applications;
  detect changes to the relationship information for the executed applications;
  store changes to the relationship information for the executed applications in the provenance graph;
  query the provenance graph, by one of the users, to select one of the recorded subsequences of the executed applications;
  automatically recommend execution of at least one of the recorded subsequences of the executed applications based on a history of execution of the recorded subsequences of the executed applications;
  create a new application with the selected subsequence of the executed applications and the recommended at least one of the subsequences of the executed applications;
  launch the newly created application; and
  store the newly created application in a catalog of applications for use by the users.

14. The computer program product of claim 13, wherein one of the executed applications is executed in the context of a note entity in the provenance graph, wherein the note entity contains output data for the executed applications.

15. The computer program product of claim 13, wherein one of the executed applications is executed in the context of a note entity in the provenance graph, wherein the note entity contains comments in addition to input and output data for one of the executed applications.

16. The computer program product of claim 13, wherein the computer server is configured to allow the users to ask queries about ownership history of the data from the provenance graph across all the users.

17. The computer program product of claim 13, wherein the computer server is configured to allow the users to ask queries about relationships between previous owners of the derived data from the provenance graph across all of the executed applications.

18. The computer program product of claim 13, wherein one of the recorded subsequences of the executed applications is recommended to one of the users based on a social relationship between the users.

* * * * *